A. C. ADAMS.
SIDE MUD SPLASH GUARD FOR MOTOR AND OTHER VEHICLES.
APPLICATION FILED APR. 14, 1914.
1,137,688. Patented Apr. 27, 1915.
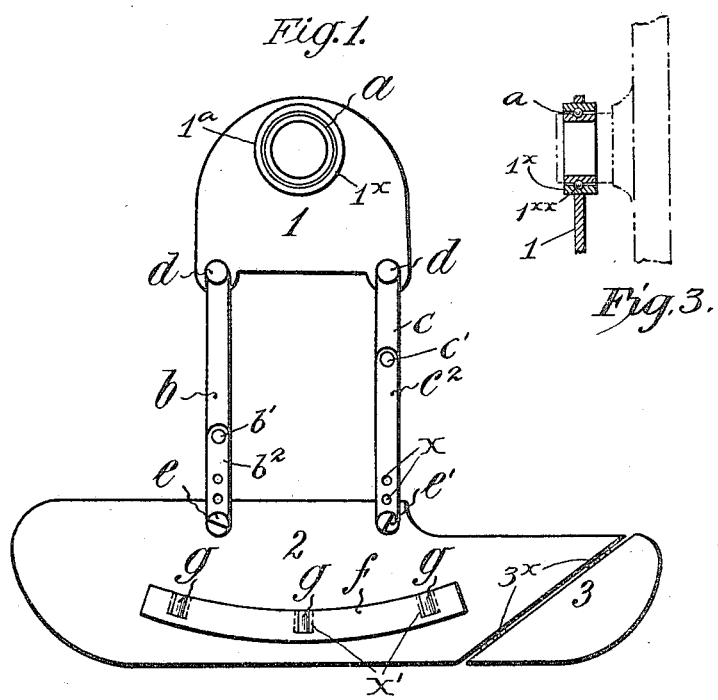

UNITED STATES PATENT OFFICE.

ALFRED CHARLES ADAMS, OF PECKHAM, LONDON, ENGLAND.

SIDE MUD-SPLASH GUARD FOR MOTOR AND OTHER VEHICLES.

1,137,688. Specification of Letters Patent. Patented Apr. 27, 1915.

Application filed April 14, 1914. Serial No. 831,813.

*To all whom it may concern:*

Be it known that I, ALFRED CHARLES ADAMS, a subject of His Majesty the King of England, residing at 5 High street, Peckham, in the county of London, Kingdom of England, have invented certain new and useful Side Mud-Splash Guards for Motor and other Vehicles, of which the following is a specification.

This invention relates to an improved side mud splash guard for motor cars and other vehicles.

The invention is hereinafter described with reference to the accompanying drawings in which:—

Figure 1 is a side elevation thereof, and Fig. 2 is a plan. Fig. 3 is a detail cross section of the supporting plate, illustrating the bearing for the axle of the vehicle.

1 indicates a supporting plate formed with an opening $1^a$ having a ball race $a$ and fitting in the opening is a ball cage $1^x$, between which and the latter and the race $a$ are balls $1^{xx}$, thus allowing the mud splash guard to remain in a vertical position when the wheel is revolving.

2 represents a splash plate suspended from the supporting plate 1. Pivoted to the plate 1 at $d$, are two depending links $b$ and $c$, link $b$ being of greater length than link $c$. Pivoted to link $b$, at $b'$, is a short link $b^2$, the lower end of which is pivoted to the splash plate at $e$, and pivoted at $c'$ to link $c$, is a long link $c^2$, pivoted to the splash plate at $e'$. The pivots $b'$ and $c'$ are thus disposed out of horizontal alinement which will allow the splash plate to rise vertically. The links $b^2$ and $c^2$ are formed at their lower ends with openings $x$, to afford convenient means for adjusting the splash plate to or from the surface of the ground. To the inside of the splash plate 2 toward the wheel is fixed a radial rib $f$ of steel and in this rib are fitted rollers to take all the side pressure, the rollers being dropped in from the top and held in place by the edges $x'$ of the walls of the openings. The tail end 3 of the guard is set inward toward the wheel, or it may be loose or flexible and made of steel, iron, or fiber, with a spring hinge for the purpose of preventing bending or breaking of the guard in the event of the vehicle skidding into the curb. The tail piece 3 is shown as being hinged to the splash plate, spring hinges $3^x$ being employed.

In operation, the supporting plate 1 is slipped over the end of the axle of the vehicle, and the device is suspended therefrom. When the splash plate encounters an obstruction the links turn on their pivots and in practice it has been found that by making links of different lengths the liability of a dead center occurring is minimized to a considerable extent. By constructing the tail piece so as to permit ready deflection, liability of damage to the device is greatly reduced.

What I claim as my invention and desire to secure by Letters Patent of the United States is:—

1. In a splash guard, the combination of a supporting plate formed with an axle receiving opening, vertically disposed links pivoted to the bottom of the supporting plate, other vertically disposed links pivoted to the lower ends of the first mentioned links, a splash plate pivoted near its upper edge to the lower ends of the second mentioned links, one end of the splash plate being inclined, a tail piece adjacent the inclined edge of the splash plate, and spring hinges securing the tail piece to the inclined edge of the splash plate.

2. In a splash guard, the combination of a splash plate having a laterally movable tail piece which is moved when encountering an obstruction, a supporting plate formed with an axle receiving opening, two pairs of links pivotally connecting the supporting plate and the splash plate, the meeting ends of each pair of links being pivoted together, the links of one pair being pivoted together below the horizontal plane of the corresponding pivot of the companion pair of links.

3. In a splash guard, the combination of a splash plate, a hinged tail piece at one end of the splash plate, a supporting plate formed with an axle receiving opening, a pair of pivoted links pivoted to the splash plate and the supporting plate, and a second pair of pivoted links pivoted to the splash plate and the supporting plate, the pivots connecting the links of the respective pairs being in different horizontal planes, the lower links of the two pairs having a series of openings to adjust the splash plate.

In testimony whereof I have signed this specification in the presence of two subscribing witnesses.

ALFRED CHARLES ADAMS.

Witnesses:
 W. L. GOFF,
 A. J. LEATHERDALE.

Copies of this patent may be obtained for five cents each, by addressing the "Commissioner of Patents, Washington, D. C."